A. C. COOKE.
Neck-Yoke.

No. 54,690. Patented May 15, 1866.

Witnesses.

Inventor
A. C. Cooke

UNITED STATES PATENT OFFICE.

A. C. COOKE, OF OHIO, ILLINOIS.

IMPROVEMENT IN NECK-YOKES.

Specification forming part of Letters Patent No. 54,690, dated May 15, 1866.

*To all whom it may concern:*

Be it known that I, A. C. COOKE, of Ohio, in the county of Bureau and State of Illinois, have invented a new and useful Improvement in Neck-Yokes; and I do hereby declare that the following is a full, clear, and exact description thereof, which will enable others skilled in the art to make and use the same, reference being had to the accompanying drawings, forming a part of this specification, in which—

Figure 1:
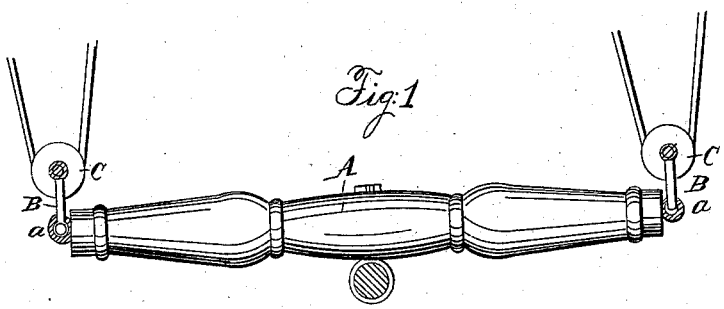
Figure 2:
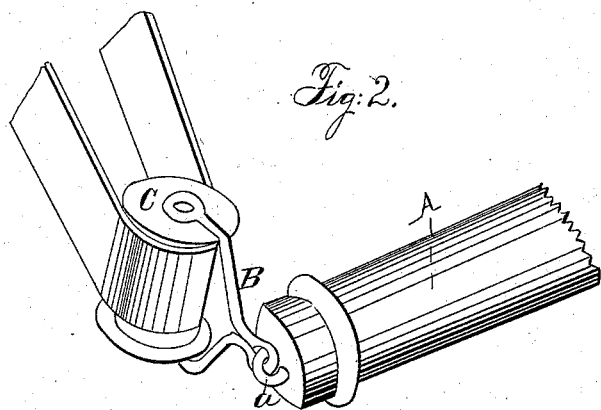

Figure 1 is a front view of my invention. Fig. 2 is an enlarged perspective view of one end of the device.

Similar letters of reference indicate like parts.

My invention relates to an improvement in that class of neck-yokes passing from the breast-strap of one animal to that of the other, and having a ring or the like through which the end of the pole passes and is thereby supported.

My invention consists in the employment, in combination with a neck-yoke, of friction spools fitted to ride upon the breast-straps of the horses in such manner that the jerking of the pole when the vehicle is passing over uneven ground will not affect the horses or wear the breast-strap in so great a degree as occurs in the usual mode of attachment.

A designates the bar of the neck-yoke, which is of the usual construction. The end of this bar carries eyes or staples $a\ a$, through which is passed a bow-shaped wire, B, which I term the "cockeye." Between the two ends of this cockeye the friction-spool C is fitted to revolve.

The breast-strap of the nigh horse is passed over the spool on one end of the bar, and the strap of the off horse over the other spool at the other end of the bar, in such manner that the spools will ride upon the strap. Consequently whenever the pole jerks the spools will revolve and the effect of the jerk will not be felt by the horses, and, furthermore, the breast-strap is not near so likely to become worn out as it is when passed through an eye on the end of the bar A.

What I claim as new, and desire to secure by Letters Patent, is—

1. The combination, with a neck-yoke, of friction-spools C, substantially as and for the purpose specified.

2. The manner of connecting the friction-spool C to the bar A, as shown and described.

A. C. COOKE.

Witnesses:
 JOSEPH G. WILSON,
 GEORGE W. YOUNG.